(12) United States Patent
Tsuji et al.

(10) Patent No.: US 11,370,448 B2
(45) Date of Patent: Jun. 28, 2022

(54) VEHICLE CONTROL DEVICE AND METHOD BASED ON USER-REQUESTED DRIVING FORCE

(71) Applicant: HONDA MOTOR CO., LTD., Tokyo (JP)

(72) Inventors: Kanta Tsuji, Wako (JP); Atsushi Ishioka, Wako (JP); Daiki Nishida, Wako (JP); Akira Shiogai, Wako (JP); Atsuki Iwamitsu, Wako (JP); Daisuke Nakanishi, Wako (JP); Koichi Fujimaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 16/728,571

(22) Filed: Dec. 27, 2019

(65) Prior Publication Data
US 2020/0207365 A1    Jul. 2, 2020

(30) Foreign Application Priority Data

Dec. 28, 2018   (JP) .............................. JP2018-246751

(51) Int. Cl.
*B60W 50/10*   (2012.01)
*B60W 60/00*   (2020.01)
(Continued)

(52) U.S. Cl.
CPC ............ *B60W 50/10* (2013.01); *B60W 40/08* (2013.01); *B60W 50/14* (2013.01);
(Continued)

(58) Field of Classification Search
None
See application file for complete search history.

(56) References Cited

U.S. PATENT DOCUMENTS

2015/0298547 A1* 10/2015 Inoue ..................... B60K 28/14
  701/70
2016/0355192 A1* 12/2016 James ..................... B60R 11/04
  (Continued)

FOREIGN PATENT DOCUMENTS

JP    2014-196039 A    10/2014
JP    2017-144776 A     8/2017
(Continued)

OTHER PUBLICATIONS

Office Action dated Oct. 6, 2020 issued over the corresponding Japanese Patent Application No. 2018-246751 with the English translation thereof.

*Primary Examiner* — James J Lee
*Assistant Examiner* — Tawri M Matsushige
(74) *Attorney, Agent, or Firm* — Carrier Blackman & Associates, P.C.; Joseph P. Carrier; Jeffrey T. Gedeon (57) ABSTRACT

A vehicle control device is equipped with a travel control unit which, in the case that a user-requested driving force exceeds a system-required driving force in a state in which a user is not in contact with an operating element, performs a travel control on the basis of a limited driving force obtained by applying a limit to the user-requested driving force, whereas in the case that the user-requested driving force exceeds the system-required driving force in a state in which the user is in contact with the operating element, performs the travel control on the basis of the user-requested driving force without applying the limit to the user-requested driving force.

13 Claims, 6 Drawing Sheets

(51) Int. Cl.
   *B60W 50/14* (2020.01)
   *B60W 40/08* (2012.01)
(52) U.S. Cl.
   CPC .... *B60W 60/0027* (2020.02); *B60W 60/0055* (2020.02); *B60W 2040/0818* (2013.01)

(56) References Cited

U.S. PATENT DOCUMENTS

| | | | |
|---|---|---|---|
| 2017/0075349 A1* | 3/2017 | Sato | B60W 40/08 |
| 2017/0227959 A1* | 8/2017 | Lauffer | G05D 1/0061 |
| 2017/0235311 A1 | 8/2017 | Sekijima | |
| 2017/0240182 A1* | 8/2017 | Hatano | B60W 10/18 |
| 2017/0248954 A1* | 8/2017 | Tomatsu | B60W 40/08 |
| 2017/0334453 A1* | 11/2017 | Mimura | B60W 30/12 |
| 2018/0105184 A1* | 4/2018 | Urano | G05D 1/0061 |
| 2018/0329416 A1* | 11/2018 | Ichikawa | B60W 40/00 |
| 2018/0370546 A1* | 12/2018 | Augst | B60K 26/021 |
| 2019/0025825 A1* | 1/2019 | Takahama | B60W 60/0053 |
| 2019/0126926 A1* | 5/2019 | Maynard | B60W 50/12 |
| 2019/0129417 A1* | 5/2019 | Noto | B60W 30/16 |
| 2019/0278264 A1* | 9/2019 | Oyama | B60W 30/182 |
| 2019/0291747 A1 | 9/2019 | Chiba | |
| 2021/0031768 A1* | 2/2021 | Yano | B60W 40/04 |

FOREIGN PATENT DOCUMENTS

| | | |
|---|---|---|
| JP | 2018-100058 A | 6/2018 |
| JP | 2018-103670 A | 7/2018 |
| JP | 2018-203120 A | 12/2018 |

\* cited by examiner

VEHICLE CONTROL DEVICE AND METHOD BASED ON USER-REQUESTED DRIVING FORCE

CROSS-REFERENCE TO RELATED APPLICATION

This application is based upon and claims the benefit of priority from Japanese Patent Application No. 2018-246751 filed on Dec. 28, 2018, the contents of which are incorporated herein by reference.

BACKGROUND OF THE INVENTION

Field of the Invention

The present invention relates to a vehicle control device and a vehicle control method.

Description of the Related Art

In Japanese Laid-Open Patent Publication No. 2017-144776, it is disclosed that, in the case that a driver is not holding the steering wheel, a target parameter, which is a target vehicle speed or an allowable lateral acceleration when passing through a forward curve, is set to a low value.

SUMMARY OF THE INVENTION

However, with the technique disclosed in Japanese Laid-Open Patent Publication No. 2017-144776, the intentions of the user cannot always be respected.

The present invention has the object of providing a vehicle control device and a vehicle control method, which can contribute to improving safety while respecting the intentions of the user.

A vehicle control device according to one aspect of the present invention comprises a driving force determination unit configured to determine a driving force when a vehicle is automatically driven, a travel control unit configured to perform a travel control for the vehicle on a basis of a system-required driving force, which is the driving force determined by the driving force determination unit, a requested driving force detection unit configured to detect a user-requested driving force, which is the driving force for the vehicle requested by a user, and a contact determination unit configured to determine whether or not the user is in contact with an operating element configured to steer the vehicle, wherein, in a case that the user-requested driving force exceeds the system-required driving force in a state in which the user is not in contact with the operating element, the travel control unit performs the travel control on a basis of a limited driving force obtained by applying a limit to the user-requested driving force, whereas, in a case that the user-requested driving force exceeds the system-required driving force in a state in which the user is in contact with the operating element, the travel control unit performs the travel control on a basis of the user-requested driving force without applying the limit to the user-requested driving force.

A vehicle control method according to another aspect of the present invention comprises a step of determining a driving force when a vehicle is automatically driven, a step of performing a travel control for the vehicle on a basis of a system-required driving force, which is the driving force determined in the step of determining the driving force, a step of detecting a user-requested driving force, which is the driving force for the vehicle requested by a user, and a step of determining whether or not the user is in contact with an operating element configured to steer the vehicle, wherein, in the step of performing the travel control, in a case that the user-requested driving force exceeds the system-required driving force in a state in which the user is not in contact with the operating element, the travel control is performed on a basis of a limited driving force obtained by applying a limit to the user-requested driving force, whereas, in a case that the user-requested driving force exceeds the system-required driving force in a state in which the user is in contact with the operating element, the travel control is performed on a basis of the user-requested driving force without applying the limit to the user-requested driving force.

According to the present invention, it is possible to provide a vehicle control device and a vehicle control method, which can contribute to improving safety while respecting the intentions of the user.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a vehicle control device and a vehicle control method according to the present invention will be presented and described in detail below with reference to the accompanying drawings.

Embodiments

Figure 1:
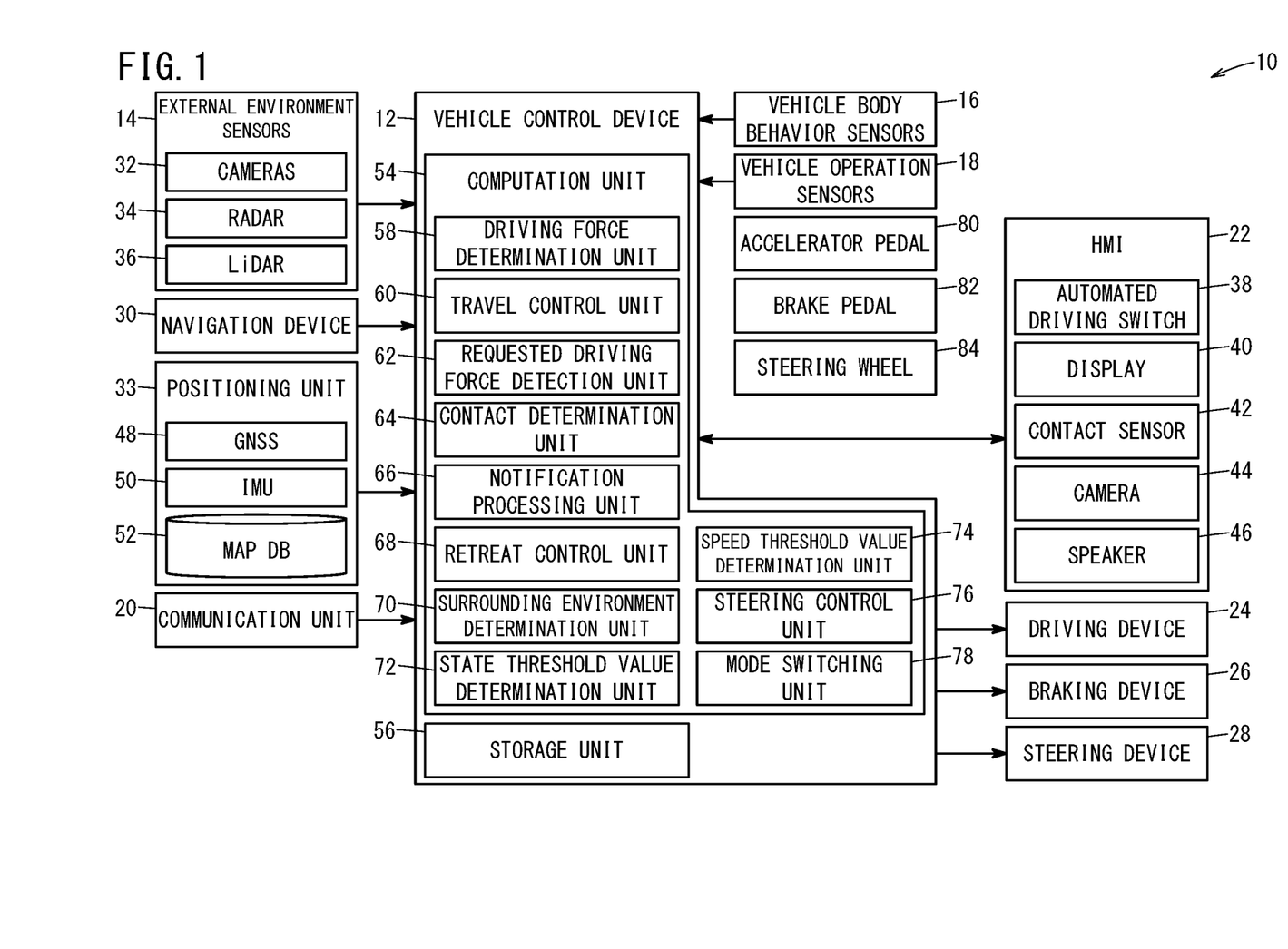
FIG. 1 is a block diagram showing a vehicle equipped with a vehicle control device according to an embodiment of the present invention.

A vehicle control device and a vehicle control method according to the embodiments will be described with reference to the drawings. FIG. 1 is a block diagram showing a vehicle equipped with the vehicle control device according to the present embodiment.

A vehicle (host vehicle, driver's own vehicle) 10 is equipped with a vehicle control device 12, namely, a vehicle control ECU (Electronic Control Unit). The vehicle 10 is further equipped with external environment sensors 14, vehicle body behavior sensors 16, vehicle operation sensors 18, a communication unit 20, and an HMI (Human Machine Interface) 22. The vehicle 10 is further equipped with a driving device 24, a braking device 26, a steering device 28, a navigation device 30, and a positioning unit 33. The vehicle 10 is further equipped with an accelerator pedal 80, a brake pedal 82, and a steering wheel (operating element, handle) 84.

The external environment sensors 14 acquire external environmental information, that is, peripheral information around the vicinity of the vehicle 10. The external environment sensors 14 include a plurality of cameras 32 and a plurality of radar devices 34. Among the external environment sensors 14, there are further included a plurality of LiDAR (Light Detection And Ranging, Laser Imaging Detection and Ranging) devices 36.

Information acquired by cameras (imaging units) 32, i.e., camera information, is supplied from the cameras 32 to the vehicle control device 12. As such camera information, there may be cited captured image information and the like. The camera information, together with radar information and LiDAR information to be described later, makes up the external environmental information. Although a single camera 32 is illustrated in FIG. 1, a plurality of cameras 32 are actually provided.

The radar devices 34 emit transmitted waves toward the exterior of the vehicle 10, and receive reflected waves that are reflected and returned by detected objects. As examples of the transmitted waves, there may be cited electromagnetic waves. As examples of the electromagnetic waves, there may be cited millimeter waves. As examples of the detected objects, there may be cited other non-illustrated vehicles. The radar devices 34 generate radar information (reflected wave signals) based on the reflected waves or the like. The radar devices 34 supply the generated radar information to the vehicle control device 12. Although one radar device 34 is illustrated in FIG. 1, a plurality of radar devices 34 are actually provided in the vehicle 10. Moreover, the radar devices 34 are not limited to using millimeter wave radar. For example, laser radar devices, or ultrasonic sensors or the like may be used as the radar devices 34.

The LiDAR devices 36 continuously irradiate lasers in all directions of the vehicle 10, measure the three-dimensional position of reflection points based on reflected waves of the emitted lasers, and output information, i.e., three dimensional information, in relation to the three-dimensional positions. The LiDAR devices 36 supply the three-dimensional information, i.e., LiDAR information, to the vehicle control device 12. Although one LiDAR device 36 is illustrated in FIG. 1, a plurality of LiDAR devices 36 are actually provided in the vehicle 10.

The vehicle body behavior sensors 16 acquire information, namely, vehicle body behavior information, in relation to the behavior of the vehicle 10. The vehicle body behavior sensors 16 include a non-illustrated vehicle speed sensor, non-illustrated vehicle wheel speed sensors, a non-illustrated acceleration sensor, and a non-illustrated yaw rate sensor. The vehicle speed sensor detects the speed, i.e., the vehicle speed, of the vehicle 10. Further, the vehicle speed sensor detects the direction in which the vehicle 10 is traveling. The vehicle wheel speed sensors detect the speed, i.e., the vehicle wheel speed, of the non-illustrated vehicle wheels. The acceleration sensor detects the acceleration of the vehicle 10. The term "acceleration" includes a longitudinal acceleration, a lateral acceleration, and a vertical acceleration. It should be noted that the acceleration of only a portion of the aforementioned directions may be detected by the acceleration sensor. The yaw rate sensor detects a yaw rate of the vehicle 10.

The vehicle operation sensors (driving operation sensors) 18 acquire information, namely, driving operation information, in relation to driving operations made by a user (driver). The vehicle operation sensors 18 include a non-illustrated accelerator pedal sensor, a non-illustrated brake pedal sensor, a non-illustrated steering angle sensor, and a non-illustrated steering torque sensor. The accelerator pedal sensor detects an operated amount of the accelerator pedal 80. The brake pedal sensor detects an operated amount of the brake pedal 82. The steering angle sensor detects the steering angle of the steering wheel 84. The torque sensor detects a torque applied to the steering wheel 84.

The communication unit 20 performs wireless communications with non-illustrated external equipment. The external equipment may include, for example, a non-illustrated external server. The communication unit 20 may be capable of being detached from the vehicle 10, or may be non-detachable with respect to the vehicle. As examples of the communication unit 20 that can be attached to and detached from the vehicle 10, there may be cited a mobile phone and a smartphone.

The HMI 22 receives an operation input made by the user (vehicle occupant), and provides various types of information to the user in a visual, audible, or tactile manner. The HMI 22 includes, for example, an automated driving switch (driving assist switch) 38, a display 40, a contact sensor 42, a camera 44, and a speaker 46.

The automated driving switch 38 is used by the user in order to instruct starting or stopping of automated driving. The automated driving switch 38 includes a non-illustrated start switch and a non-illustrated stop switch. The start switch outputs a start signal to the vehicle control device 12 in accordance with an operation of the user. The stop switch outputs a stop signal to the vehicle control device 12 in accordance with an operation of the user.

The display (display unit) 40 includes, for example, a liquid crystal panel or an organic EL panel or the like. In this instance, although an exemplary case will be described in which the display 40 is a touch panel, the present invention is not limited to this feature.

The contact sensor 42 is provided on the steering wheel 84, for example. The contact sensor 42 detects whether or not the user (driver) is touching the steering wheel 84. Signals output from the contact sensor 42 are supplied to a contact determination unit 64, to be described later.

The camera 44 captures images of the interior, i.e., a non-illustrated vehicle compartment interior, of the vehicle 10. The camera 44 may be disposed, for example, on a non-illustrated dashboard, or may be disposed on a non-illustrated ceiling of the vehicle 10. Further, the camera 44 may be disposed in a manner so that images are captured of only the driver, or may be disposed in a manner so that images are captured of each of the vehicle occupants. The camera 44 outputs information, i.e., image information, which is acquired by capturing images of the vehicle compartment interior, to the vehicle control device 12.

The speaker 46 serves to provide various types of information to the user by way of sound or voice. The vehicle control device 12 outputs various notifications, alarms, or the like using the speaker 46.

The driving device (driving force control system) 24 includes a non-illustrated drive ECU, and a non-illustrated drive source. By controlling the drive source, the drive ECU controls the driving force (torque) of the vehicle 10. As examples of the drive source, there may be cited an engine or a drive motor. The drive ECU is capable of controlling the driving force by controlling the drive source, based on an operation made by the user with respect to the accelerator pedal 80. Further, the drive ECU is capable of controlling the driving force by controlling the drive source, based on a command supplied from the vehicle control device 12. The driving force of the drive source is transmitted to the non-illustrated vehicle wheels via a non-illustrated transmission.

The braking device (braking force control system) 26 includes a non-illustrated brake ECU, and a non-illustrated brake mechanism. The brake mechanism actuates a brake member by a brake motor, a hydraulic mechanism, or the like. The brake ECU is capable of controlling the braking force by controlling the brake mechanism, based on an operation made by the user with respect to the brake pedal 82. Further, the brake ECU is capable of controlling the braking force by controlling the brake mechanism, based on a command supplied from the vehicle control device 12.

The steering device (steering system) 28 includes a non-illustrated steering ECU, and more specifically, an EPS (electric power steering system) ECU, and a non-illustrated steering motor. The steering ECU controls the direction of the vehicle wheels (steering wheels) by controlling the steering motor, based on an operation made by the user with respect to the steering wheel 84. Further, the steering ECU controls the direction of the vehicle wheels by controlling the steering motor, based on a command supplied from the vehicle control device 12. Steering may be performed by changing the torque distribution and the braking force distribution to the left and right vehicle wheels.

The navigation device 30 is equipped with a non-illustrated GNSS (Global Navigation Satellite System) sensor. In addition, the navigation device 30 is further equipped with a non-illustrated computation unit and a non-illustrated storage unit. The GNSS sensor detects the current position of the vehicle 10. From a map database stored in the storage unit, the computation unit reads out map information corresponding to the current position detected by the GNSS sensor. Using the map information, the computation unit determines a target route from the current position to a destination. The destination is input by the user via the HMI 22. As described above, the display 40 is a touch panel. The destination is input by the touch panel being operated by the user. The navigation device 30 outputs the created target route to the vehicle control device 12. The vehicle control device 12 supplies the target route to the HMI 22. The HMI 22 displays the target route on the display 40.

The positioning unit 33 is equipped with a GNSS 48. The positioning unit 33 is further provided with an IMU (Inertial Measurement Unit) 50 and a map database (map DB) 52. The positioning unit 33 specifies the position of the vehicle 10 by appropriately using the information obtained by the GNSS 48, the information obtained by the IMU 50, and the map information stored in the map database 52.

The vehicle control device 12 is equipped with a computation unit 54 and a storage unit 56. The computation unit 54 governs the overall control of the vehicle control device 12. The computation unit 54 is constituted, for example, by a CPU (Central Processing Unit). The computation unit 54 executes the vehicle control by controlling each of the respective units based on programs stored in the storage unit 56.

The computation unit 54 comprises a driving force determination unit 58, a travel control unit 60, a requested driving force detection unit 62, the contact determination unit 64, a notification processing unit 66, and a retreat control unit 68. The computation unit 54 further comprises a surrounding environment determination unit 70, a state threshold value determination unit 72, a speed threshold value determination unit 74, a steering control unit 76, and a mode switching unit 78. The driving force determination unit 58, the travel control unit 60, the requested driving force detection unit 62, the contact determination unit 64, the notification processing unit 66, and the retreat control unit 68 can be realized by programs, which are stored in the storage unit 56, being executed by the computation unit 54. Further, the surrounding environment determination unit 70, the state threshold value determination unit 72, the speed threshold value determination unit 74, the steering control unit 76, and the mode switching unit 78 can be realized by programs, which are stored in the storage unit 56, being executed by the computation unit 54.

The storage unit 56 includes a non-illustrated volatile memory, and a non-illustrated nonvolatile memory. As an example of the volatile memory, there may be cited a RAM (Random Access Memory). As an example of the nonvolatile memory, there may be cited a ROM (Read Only Memory), a flash memory, or the like. The external environmental information, the vehicle body behavior information, and the vehicle operation information, etc., are stored, for example, in the volatile memory. Programs, tables, maps, and the like are stored, for example, in the nonvolatile memory.

The driving force determination unit 58 determines the driving force when the vehicle 10 is automatically driven.

The travel control unit 60 performs a travel control for the vehicle 10 on the basis of the driving force determined by the driving force determination unit 58. The driving force determined by the driving force determination unit 58 is referred to as a system-required driving force.

The requested driving force detection unit (user-requested driving force detection unit) 62 detects a user-requested driving force, which is the driving force for the vehicle 10 requested by the user (driver). The requested driving force detection unit 62 detects the user-requested driving force, for example, on the basis of an amount by which the accelerator pedal 80 is operated by the user.

The contact determination unit 64 determines whether or not the user is in contact with the steering wheel 84 in order to steer the vehicle 10. The contact determination unit 64 can determine whether the user is in contact with the steering wheel 84 on the basis of a signal supplied from the contact sensor 42. Moreover, in this instance, although a case has been described in which the determination of whether or not the user is in contact with the steering wheel 84 is determined on the basis of a signal supplied from the contact sensor 42, the invention is not limited to this feature. For example, the contact determination unit 64 may determine whether or not the user is in contact with the steering wheel 84 on the basis of image information acquired by the camera 44. In this case, the image information acquired by the camera 44 is supplied to the contact determination unit 64. Further, the contact determination unit 64 may determine whether or not the user is in contact with the steering wheel 84 on the basis of a torque applied to the steering wheel 84. In this case, the torque (input torque) detected by the steering torque sensor is supplied to the contact determination unit 64.

The travel control unit 60 performs the following processes in the case that the user-requested driving force exceeds the system-required driving force in a state in which the user is not in contact with the steering wheel 84. More specifically, in such a case, the travel control unit 60 performs the travel control on the basis of a limited driving force obtained by applying a limit to the user-requested driving force. Moreover, the user-requested driving force exceeding the system-required driving force includes not only a case in which the user-requested driving force is detected to be in excess of the system-required driving force, but also cases in which the user-requested driving force is capable of exceeding the system-required driving force.

The travel control unit 60 performs the following processes in the case that the user-requested driving force exceeds the system-required driving force in a state in which the user is in contact with the steering wheel 84. More specifically, in such a case, the travel control unit 60 performs the travel control on the basis of the user-requested driving force without applying a limit to the user-requested driving force.

The travel control includes a first control state and a second control state. The second control state is a control state in which the burden on the driver is lighter than in the first control state, or alternatively, in which the degree of automation is higher than in the first control state.

Although the upper limit of the system-required driving force in the first control state differs from the upper limit of the system-required driving force in the second control state, the invention is not limited to this feature. The upper limit of the system-required driving force in the first control state can be set, for example, to 130 km/h; however, the present invention is not limited to this feature. The upper limit of the system-required driving force in the second control state can be set, for example, to 60 km/h; however, the present invention is not limited to this feature. The system-required driving force may be a speed, or may be an acceleration.

In the case that the user-requested driving force exceeds the system-required driving force, the notification processing unit 66 performs a notification process for prompting the user to steer the vehicle 10, and more specifically, performs a notification process for prompting the user to implement a change in driving.

In the case that the user is in contact with the steering wheel 84, or alternatively, in the case that the torque applied to the steering wheel 84 is greater than or equal to a predetermined value, the contact determination unit 64 determines that steering of the vehicle 10 is being performed by the user.

The retreat control unit 68 carries out a retreat control to cause the vehicle 10 to retreat, in the case that the state in which the user is not in contact with the steering wheel 84 exceeds a state threshold value, in spite of the fact that the user has been prompted to steer the vehicle 10. The state threshold value is a predetermined amount of elapsed time or a predetermined travel distance. Stated otherwise, the retreat control unit 68 carries out the retreat control to cause the vehicle 10 to retreat, in the case that the state in which the user is not in contact with the steering wheel 84 exceeds a predetermined elapsed time period, in spite of the fact that the user has been prompted to steer the vehicle 10. The retreat control unit 68 carries out the retreat control to cause the vehicle 10 to retreat, in the case that traveling has taken place beyond a predetermined distance in the state in which the user is not in contact with the steering wheel 84, in spite of the fact that the user has been prompted to steer the vehicle 10. A timing for starting the computation of whether or not the state in which the user is not in contact with the steering wheel 84 is in excess of the state threshold value can be, for example, a timing at which the user-requested driving force has exceeded the system-required driving force; however, the present invention is not limited to this feature.

The travel control unit 60 continues the travel control in the case that the user has come into contact with the steering wheel 84 before the retreat control by the retreat control unit 68 is started.

When the retreat control is being performed by the retreat control unit 68, the travel control unit 60 performs the travel control without being based on the user-requested driving force detected by the requested driving force detection unit 62. More specifically, when the retreat control is being performed, the travel control unit 60 does not accept the driving force for the vehicle 10 requested by the user. Stated otherwise, when the retreat control is being performed, the travel control unit 60 does not accept operations of the accelerator pedal 80 made by the user.

The surrounding environment determination unit 70 determines the surrounding environment, and more specifically, the surrounding environment around the periphery of the vehicle 10. As examples of the surrounding environment, there may be cited road congestion, the slope or gradient of the road, the weather, road signs (speed limit signs), and the like; however, the present invention is not limited to this feature.

The state threshold value determination unit 72 determines a state threshold value. The state threshold value is a predetermined amount of elapsed time or a predetermined travel distance. The state threshold value determination unit 72 can determine the state threshold value on the basis of the surrounding environment determined by the surrounding environment determination unit 70. For example, the state threshold value determination unit 72 can appropriately determine the state threshold value on the basis of the degree of road congestion, the slope or gradient of the road, the weather, road signs, and the like.

The speed threshold value determination unit 74 determines a speed threshold value. The speed threshold value in the first control state differs from the speed threshold value in the second control state; however, the present invention is not limited to this feature. The speed threshold value in the first control state is lower than an upper limit of the system-required driving force in the first control state. Stated otherwise, the speed threshold value in the first control state is lower than an upper limit of the vehicle speed in the first control state. The speed threshold value in the second control state is lower than an upper limit of the system-required driving force in the second control state. Stated otherwise, the speed threshold value in the second control state is lower than an upper limit of the vehicle speed in the second control state. In the case that the upper limit of the vehicle speed in the first control state is, for example, 130 km/h, the speed threshold value in the first control state can be, for example, 120 km/h; however, the present invention is not limited to this feature. Further, in the case that the upper limit of the vehicle speed in the second control state is, for example, 60 km/h, the speed threshold value in the second control state can be, for example, 50 km/h; however, the present invention is not limited to this feature. The speed threshold value determination unit 74 can determine the speed threshold value on the basis of the surrounding environment determined by the surrounding environment determination unit 70. For example, the speed threshold value determination unit 74 can appropriately determine the speed threshold value on the basis of the degree of road congestion, the slope or gradient of the road, the weather, road signs, and the like. In the case that the speed of the vehicle 10 is in excess of the speed threshold value, the travel control unit 60 performs the travel control on the basis of the limited driving force obtained by applying a further limit to the user-requested driving force.

The steering control unit 76 automatically performs a steering control for the vehicle 10.

The mode switching unit 78 switches between the first mode and the second mode. The first mode is a mode in which the steering control for the vehicle 10 is automatically performed by the steering control unit 76. The second mode is a mode in which the user steers the vehicle 10. The mode switching unit 78 is capable of switching from the first mode to the second mode, in the case that the contact determination unit 64 determines that the user is in contact with the steering wheel 84; however, the present invention is not limited to this feature.

Figure 2:
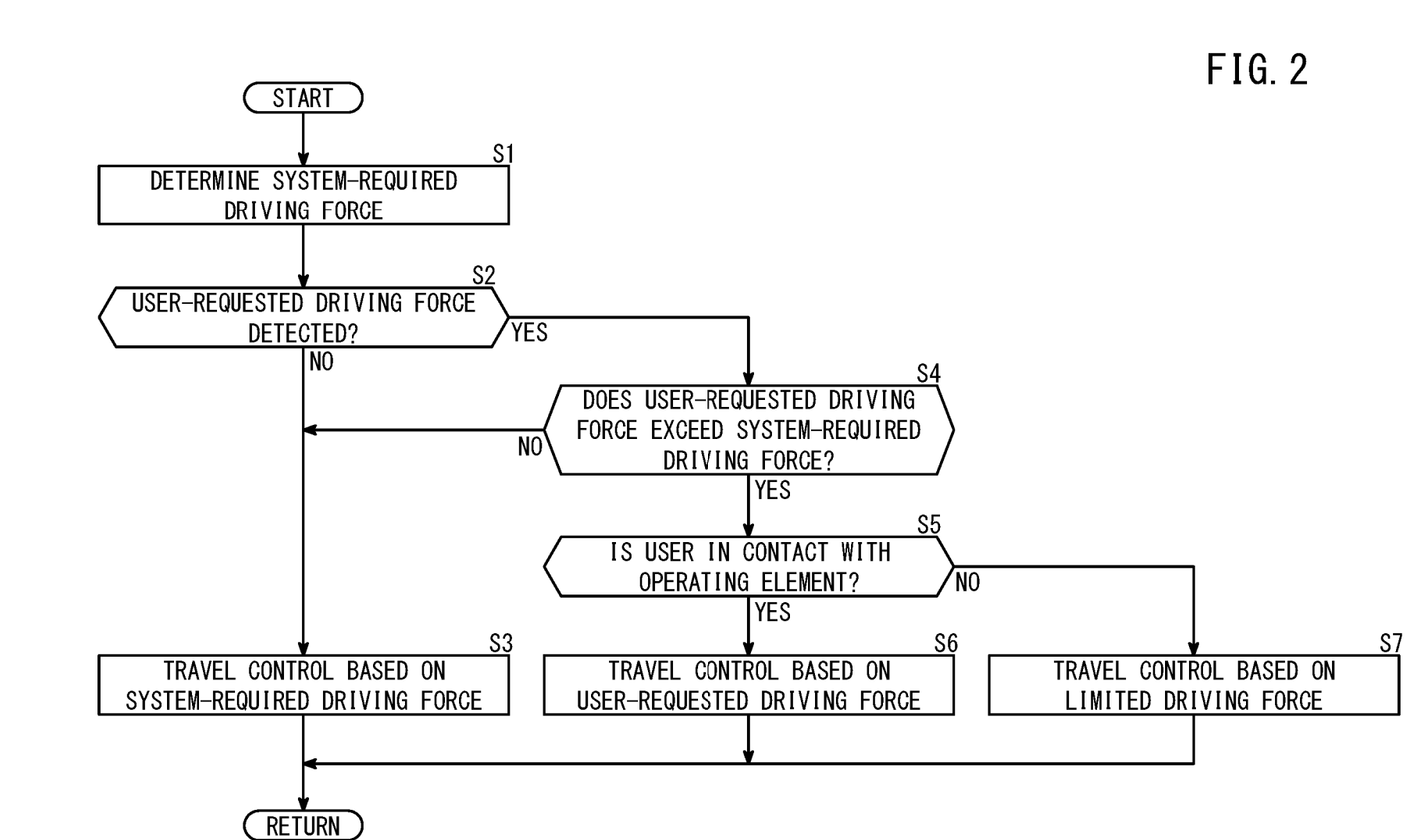
FIG. 2 is a flowchart showing an example of operations of the vehicle control device according to the embodiment.

Next, operations of the vehicle control device 12 according to the present embodiment will be described. FIG. 2 is a flowchart showing an example of operations of the vehicle control device according to the present embodiment.

In step S1, the driving force determination unit 58 determines the driving force when the vehicle 10 is automatically driven. The driving force determined by the driving force determination unit 58 is referred to as a system-required driving force. Thereafter, the process transitions to step S2.

In step S2, the requested driving force detection unit 62 detects the user-requested driving force, which is the driving force for the vehicle 10 requested by the user (driver). The requested driving force detection unit 62 detects the user-requested driving force on the basis of an amount by which the accelerator pedal 80 is operated. In the case that the user-requested driving force is not detected by the requested driving force detection unit 62 (NO in step S2), the process transitions to step S3. In the case that the user-requested driving force is detected by the requested driving force detection unit 62 (YES in step S2), the process transitions to step S4.

In step S3, the travel control unit 60 performs the travel control on the basis of the driving force, and more specifically, the system-required driving force determined by the driving force determination unit 58.

In step S4, the travel control unit 60 determines whether or not the user-requested driving force exceeds the system-required driving force. In the case that the user-requested driving force exceeds the system-required driving force (YES in step S4), the process transitions to step S5. In the case that the user-requested driving force does not exceed the system-required driving force (NO in step S4), the process transitions to step S3.

In step S5, the contact determination unit 64 determines whether or not the user is in contact with the steering wheel 84. In the case that the user is in contact with the steering wheel 84 (YES in step S5), the process transitions to step S6. In the case that the user is not in contact with the steering wheel 84 (NO in step S5), the process transitions to step S7.

In step S6, the travel control unit 60 performs the travel control on the basis of the user-requested driving force, without applying a limit to the user-requested driving force.

In step S7, the travel control unit 60 performs the travel control on the basis of a limited driving force obtained by applying a limit to the user-requested driving force. In the foregoing manner, the process shown in FIG. 2 is carried out.

Figure 3:
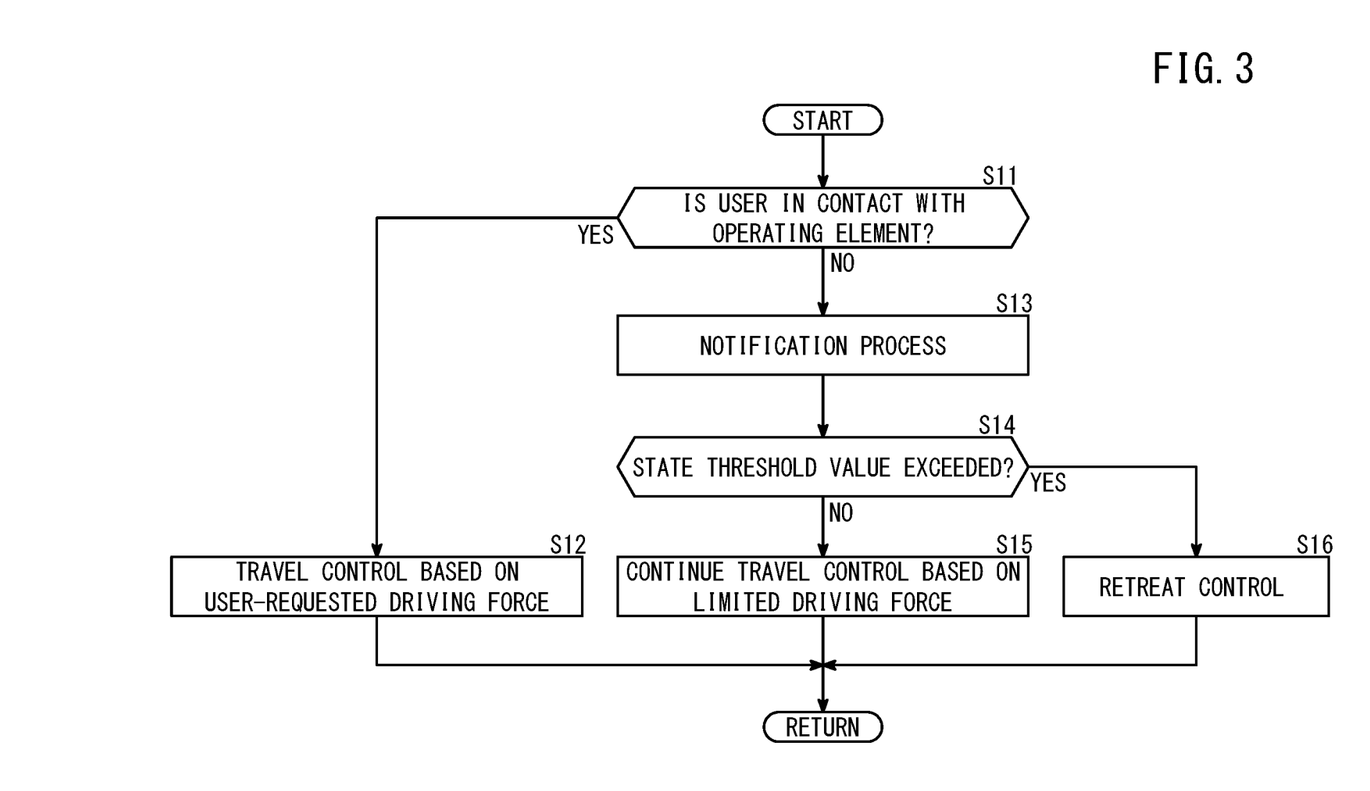
FIG. 3 is a flowchart showing an example of operations of the vehicle control device according to the embodiment.

FIG. 3 is a flowchart showing an example of operations of the vehicle control device according to the present embodiment. In the case that the user-requested driving force exceeds the system-required driving force in a state in which the user is not in contact with the steering wheel 84, the process shown in FIG. 3 is initiated. More specifically, when the travel control on the basis of the limited driving force obtained by applying the limit to the user-requested driving force is carried out, the process shown in FIG. 3 is initiated.

In step S11, the contact determination unit 64 determines whether or not the user is in contact with the steering wheel 84. In the case that the user is in contact with the steering wheel 84 (YES in step S11), the process transitions to step S12. In the case that the user is not in contact with the steering wheel 84 (NO in step S11), the process transitions to step S13.

In step S12, the travel control unit 60 performs the travel control on the basis of the user-requested driving force, without applying a limit to the user-requested driving force.

In step S13, the notification processing unit 66 issues a notification in order to prompt the user to steer the vehicle 10. Thereafter, the process transitions to step S14.

In step S14, the retreat control unit 68 determines whether or not the state in which the user is not in contact with the steering wheel 84 has exceeded the state threshold value. As noted previously, the state threshold value is a predetermined amount of elapsed time or a predetermined travel distance. In the case that the state in which the user is not in contact with the steering wheel 84 is less than or equal to the state threshold value (NO in step S14), the process transitions to step S15. In the case that the state in which the user is not in contact with the steering wheel 84 has exceeded the state threshold value (YES in step S14), the process transitions to step S16.

In step S15, the travel control unit 60 continues the travel control on the basis of the limited driving force obtained by applying the limit to the user-requested driving force.

In step S16, the travel control unit 60 performs the retreat control, which is a control for causing the vehicle 10 to retreat. Such a retreat control is referred to as a Minimal Risk Maneuver (MRM). In the retreat control, the travel control unit 60 automatically and safely stops the vehicle 10 while either maintaining or changing the lane, and while providing a warning to the surrounding vicinity. In the foregoing manner, the process shown in FIG. 3 is carried out.

Figure 4:
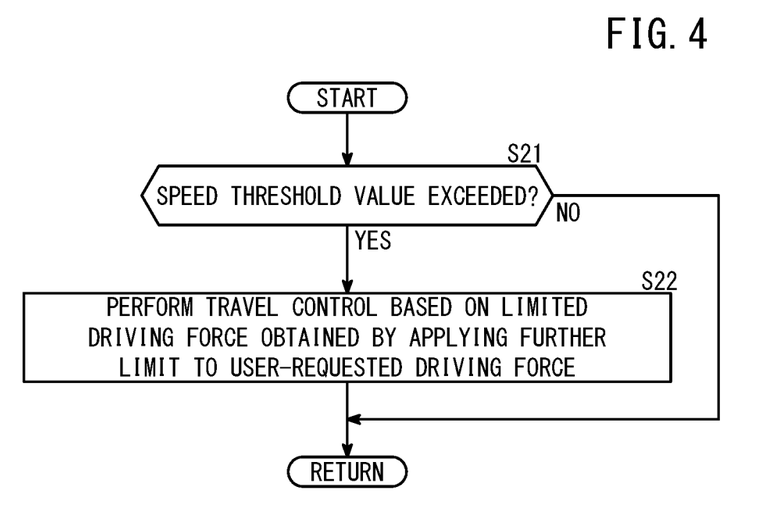
FIG. 4 is a flowchart showing an example of operations of the vehicle control device according to the embodiment.

FIG. 4 is a flowchart showing an example of operations of the vehicle control device according to the present embodiment. In the case that the user-requested driving force exceeds the system-required driving force in a state in which the user is not in contact with the steering wheel 84, the process shown in FIG. 4 is initiated. More specifically, when the travel control on the basis of the limited driving force obtained by applying the limit to the user-requested driving force is carried out, the process shown in FIG. 4 is initiated.

In step S21, the travel control unit 60 determines whether or not the speed of the vehicle 10 is in excess of the speed threshold value. In the case that the speed of the vehicle 10 is in excess of the speed threshold value (YES in step S21), the process transitions to step S22. In the case that the speed of the vehicle 10 is not in excess of the speed threshold value (NO in step S21), the process shown in FIG. 4 is brought to an end.

In step S22, the travel control unit 60 performs the travel control on the basis of a limited driving force obtained by applying a further limit to the user-requested driving force. Upon doing so, the process shown in FIG. 4 is brought to an end.

Figure 5:
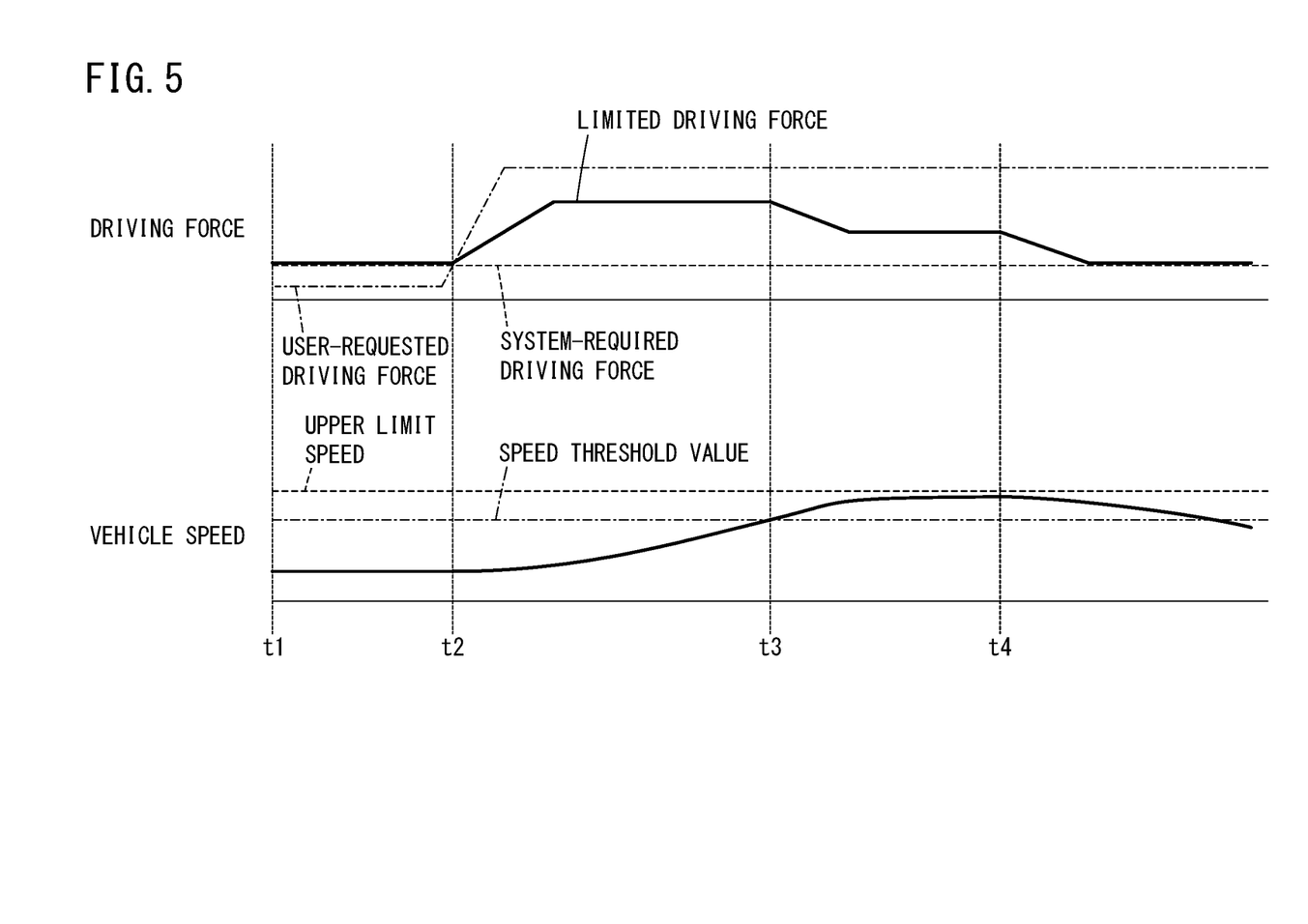
FIG. 5 is a time chart showing an example of operations of the vehicle control device according to the embodiment.

FIG. 5 is a time chart showing an example of operations of the vehicle control device according to the present embodiment. In FIG. 5, operations are shown for a case in which the user-requested driving force exceeds the system-required driving force in a state in which the user is not in contact with the steering wheel 84.

At timing t1, the user-requested driving force is not in excess of the system-required driving force.

At timing t2, the user-requested driving force exceeds the system-required driving force. Since the user-requested driving force is in excess of the system-required driving force in the state in which the user is not in contact with the steering wheel 84, the travel control is performed on the basis of the limited driving force obtained by applying the limit to the user-requested driving force. The speed of the vehicle 10 gradually increases.

At timing t3, the speed of the vehicle 10 exceeds the speed threshold value. The travel control is performed on the basis of the limited driving force obtained by applying a further limit to the user-requested driving force. Consequently, the speed of the vehicle 10 is prevented from reaching the upper limit speed.

At timing t4, the state in which the user is not in contact with the steering wheel 84 exceeds the state threshold value. As noted previously, the state threshold value is a predetermined amount of elapsed time or a predetermined travel distance. Since the state in which the user is not in contact with the steering wheel 84 exceeds the state threshold value, the retreat control unit 68 performs the retreat control, which is a control for causing the vehicle 10 to retreat. In the retreat control, traveling of the vehicle 10 is controlled on the basis of the system-required driving force. In the case that the user is in contact with the steering wheel 84 before the state threshold value is exceeded, the retreat control is not carried out by the retreat control unit 68, and the travel control by the travel control unit 60 is continued.

Figure 6:
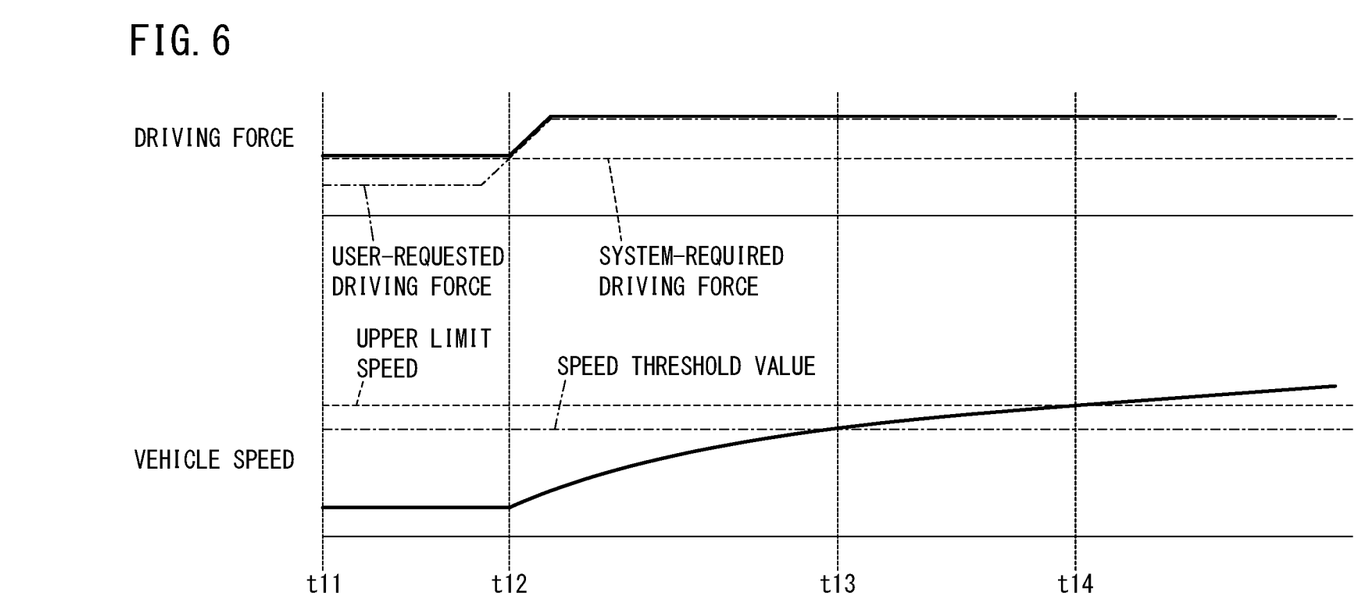
FIG. 6 is a time chart showing another example of operations of the vehicle control device according to the embodiment.

FIG. 6 is a time chart showing another example of operations of the vehicle control device according to the present embodiment. In FIG. 6, operations are shown for a case in which the user-requested driving force exceeds the system-required driving force in a state in which the user is in contact with the steering wheel 84.

At timing t11, the user-requested driving force is not in excess of the system-required driving force. Since the user-requested driving force is not in excess of the system-required driving force, the travel control is performed on the basis of the system-required driving force.

At timing t12, the user-requested driving force exceeds the system-required driving force. Since the user-requested driving force is in excess of the system-required driving force in the state in which the user is in contact with the steering wheel 84, the travel control is performed on the basis of the user-requested driving force.

At timing t13, the speed of the vehicle 10 exceeds the speed threshold value. Even in the case that the speed of the vehicle 10 has exceeded the speed threshold value, the travel control on the basis of the user-requested driving force is continued.

At timing t14, the speed of the vehicle 10 exceeds the upper limit speed. The upper limit speed is an upper limit speed for a case in which automated driving is performed. Even in the case that the speed of the vehicle 10 has exceeded the upper limit speed, the travel control on the basis of the user-requested driving force is continued.

In the foregoing manner, according to the present embodiment, in the case that the user-requested driving force is in excess of the system-required driving force in the state in which the user is not in contact with the steering wheel 84, the travel control is performed on the basis of the limited driving force obtained by applying the limit to the user-requested driving force. Therefore, according to the present embodiment, it is possible to contribute to the improvement of safety. Further, according to the present embodiment, in the case that the user-requested driving force is in excess of the system-required driving force in the state in which the user is in contact with the steering wheel 84, the travel control is performed on the basis of the user-requested driving force without applying the limit to the user-requested driving force. Therefore, according to the present embodiment, the travel control can be carried out based on the intentions of the user. Thus, according to the present embodiment, it is possible to provide the vehicle control device 12 which is capable of contributing to improving safety while respecting the intentions of the user.

Although preferred embodiments of the present invention have been described above, the present invention is not limited to the above-described embodiment, and various modifications can be made thereto without departing from the essence and gist of the present invention.

Summarizing the embodiments described above, the following features and advantages are realized.

The vehicle control device (12) comprises the driving force determination unit (58) that determines the driving force when the vehicle (10) is automatically driven, the travel control unit (60) that performs the travel control for the vehicle on the basis of the system-required driving force, which is the driving force determined by the driving force determination unit, the requested driving force detection unit (62) that detects the user-requested driving force, which is the driving force for the vehicle requested by the user, and the contact determination unit (64) that determines whether or not the user is in contact with the operating element (84) for steering the vehicle, wherein, in the case that the user-requested driving force exceeds the system-required driving force in a state in which the user is not in contact with the operating element, the travel control unit performs the travel control on the basis of the limited driving force obtained by applying the limit to the user-requested driving force, whereas, in the case that the user-requested driving force exceeds the system-required driving force in a state in which the user is in contact with the operating element, the travel control unit performs the travel control on the basis of the user-requested driving force without applying the limit to the user-requested driving force. In accordance with such a configuration, in the case that the user-requested driving force is in excess of the system-required driving force in the state in which the user is not in contact with the operating element, the travel control is performed on the basis of the limited driving force obtained by applying the limit to the user-requested driving force. Therefore, in accordance with such a configuration, it is possible to contribute to the improvement of safety. Further, in accordance with such a configuration, in the case that the user-requested driving force is in excess of the system-required driving force in the state in which the user is in contact with the operating element, the travel control is performed on the basis of the user-requested driving force without applying the limit to the user-requested driving force. In accordance with such a configuration, the travel control can be carried out based on the intentions of the user.

The travel control may include the first control state, and the second control state in which the burden on the driver is lighter than in the first control state, or in which the degree of automation is higher than in the first control state, and the upper limit of the system-required driving force in the first control state may differ from the upper limit of the system-required driving force in the second control state.

There may further be provided the notification processing unit (66) which prompts the user to steer the vehicle, in the case that the user-requested driving force exceeds the system-required driving force. In accordance with such a configuration, it is possible to further contribute to the improvement of safety.

The contact determination unit may determine that the user is steering the vehicle, in the case that the user is in contact with the operating element, or in the case that a torque applied to the operating element is greater than or equal to a predetermined value.

There may further be provided the retreat control unit (68) which performs the retreat control to cause the vehicle to retreat, in the case that the state in which the user is not in contact with the operating element exceeds the state threshold value, in spite of the user having been prompted to steer the vehicle. In accordance with such a configuration, it is possible to further contribute to the improvement of safety.

The state threshold value may be a predetermined amount of elapsed time or a predetermined travel distance.

When the retreat control is being performed by the retreat control unit, the travel control unit may perform the travel control without being based on the user-requested driving force detected by the requested driving force detection unit.

In the case that the user has come into contact with the operating element before the retreat control by the retreat control unit is initiated, the travel control unit may continue the travel control. In accordance with such a configuration, smooth traveling of the vehicle can be realized.

In the case that the speed of the vehicle is in excess of a speed threshold value, the travel control unit may perform the travel control on the basis of the limited driving force obtained by applying a further limit to the user-requested driving force. In accordance with such a configuration, it is possible to further contribute to the improvement of safety.

The travel control may include the first control state, and the second control state in which a burden on the driver is lighter than in the first control state, or in which the degree of automation is higher than in the first control state, wherein, in the case that the speed of the vehicle is in excess of the speed threshold value, the travel control unit performs the travel control on the basis of the limited driving force obtained by applying a further limit to the user-requested driving force, and the speed threshold value in the second control state is lower than the speed threshold value in the first control state.

There may further be provided the surrounding environment determination unit (70) which determines the surrounding environment, and the state threshold value determination unit (72) which determines the state threshold value on the basis of the surrounding environment determined by the surrounding environment determination unit. In accordance with such a configuration, since the state threshold value is determined on the basis of the surrounding environment, it is possible to further contribute to the improvement of safety.

There may further be provided the surrounding environment determination unit which determines the surrounding environment, and the speed threshold value determination unit (74) which determines the speed threshold value on the basis of the surrounding environment determined by the surrounding environment determination unit.

There may further be provided the steering control unit (76) which automatically performs the steering control for the vehicle, and the mode switching unit (78) which switches between the first mode in which the steering control for the vehicle is performed by the steering control unit, and the second mode in which steering of the vehicle is performed by the user, wherein the mode switching unit may switch from the first mode to the second mode in the case that the contact determination unit determines that the user is in contact with the operating element.

The vehicle control method comprises the step (step S1) of determining the driving force when the vehicle is automatically driven, the step (step S3, step S6, step S7) of performing the travel control for the vehicle on the basis of the system-required driving force, which is the driving force determined in the step of determining the driving force, the step (step S2) of detecting the user-requested driving force, which is the driving force for the vehicle requested by the user, and the step (step S5) of determining whether or not the user is in contact with the operating element for steering the vehicle, wherein, in the step of performing the travel control, in the case that the user-requested driving force exceeds the system-required driving force in a state in which the user is not in contact with the operating element, the travel control is performed on the basis of the limited driving force obtained by applying the limit to the user-requested driving force (step S7), whereas, in the case that the user-requested driving force exceeds the system-required driving force in a state in which the user is in contact with the operating element, the travel control is performed on the basis of the user-requested driving force without applying the limit to the user-requested driving force (step S6).

What is claimed is:

1. A vehicle control device, comprising one or more processors that execute computer-executable instructions stored in a memory, wherein the one or more processors execute the computer-executable instructions to cause the vehicle control device to:

determine a system-required driving force when a vehicle is automatically driven;

perform a travel control for the vehicle on a basis of the system-required driving force;

detect a full user-requested driving force, which is the driving force for the vehicle requested by a user;

determine whether or not the user is in contact with an operating element configured to steer the vehicle, wherein, in a case that the full user-requested driving force exceeds the system-required driving force in a state in which the user is not in contact with the operating element and a speed of the vehicle is not in excess of a speed threshold value, the one or more processors cause the vehicle control device to perform the travel control on a basis of a partial user-requested driving force which is less than the full user-requested driving force;

in a case that the full user-requested driving force exceeds the system-required driving force in a state in which the user is not in contact with the operating element and a speed of the vehicle is in excess of a speed threshold value, the one or more processors cause the vehicle control device to perform the travel control on a basis of a partial driving force which is less than the partial user-requested driving force; and in a case that the full user-requested driving force exceeds the system-required driving force in a state in which the user is in contact with the operating element, the one or more processors cause the vehicle control device to perform the travel control on a basis of the full user-requested driving force, and wherein the vehicle is being automatically driven during the performance of the travel control.

2. The vehicle control device according to claim 1, wherein:

the travel control includes a first control state, and a second control state in which a burden on the driver is lighter than in the first control state, or in which a degree of automation is higher than in the first control state; and an upper limit of the system-required driving force in the first control state differs from an upper limit of the system-required driving force in the second control state.

3. The vehicle control device according to claim 1, wherein the one or more processors cause the vehicle control device to prompt the user to steer the vehicle, in the case that the full user-requested driving force exceeds the system-required driving force.

4. The vehicle control device according to claim 3, wherein the one or more processors cause the vehicle control device to determine that the user is steering the vehicle, in a case that the user is in contact with the operating element, or in a case that a torque applied to the operating element is greater than or equal to a predetermined value.

5. The vehicle control device according to claim 3, wherein the one or more processors cause the vehicle control device to perform a retreat control to cause the vehicle to retreat, in a case that the state in which the user is not in contact with the operating element exceeds a state threshold value, in spite of the user having been prompted to steer the vehicle.

6. The vehicle control device according to claim 5, wherein the state threshold value is a predetermined amount of elapsed time or a predetermined travel distance.

7. The vehicle control device according to claim 5, wherein, when the retreat control is being performed, the one or more processors cause the vehicle control device to perform the travel control without being based on the full user-requested driving force.

8. The vehicle control device according to claim 5, wherein, in a case that the user has come into contact with the operating element before the retreat control is initiated, the one or more processors cause the vehicle control device to continue the travel control.

9. The vehicle control device according to claim 1, wherein:
the travel control includes a first control state, and a second control state in which a burden on the driver is lighter than in the first control state, or in which a degree of automation is higher than in the first control state;
the speed threshold value in the second control state is lower than the speed threshold value in the first control state.

10. The vehicle control device according to claim 5, wherein the one or more processors cause the vehicle control device to:
determine a surrounding environment; and
determine the state threshold value on a basis of the surrounding environment determined.

11. The vehicle control device according to claim 1, wherein the one or more processors cause the vehicle control device to:
determine a surrounding environment; and
determine the speed threshold value on a basis of the surrounding environment determined.

12. The vehicle control device according to claim 1, wherein the one or more processors cause the vehicle control device to:
automatically perform a steering control for the vehicle; and
switch between a first mode in which the steering control for the vehicle is performed, and a second mode in which steering of the vehicle is performed by the user, and
wherein the one or more processors cause the vehicle control device to switch from the first mode to the second mode in a case that it is determined that the user is in contact with the operating element.

13. A vehicle control method comprising:
a step of determining a system-required driving force when a vehicle is automatically driven;
a step of performing a travel control for the vehicle on a basis of the system-required driving force;
a step of detecting a full user-requested driving force, which is the driving force for the vehicle requested by a user; and
a step of determining whether or not the user is in contact with an operating element configured to steer the vehicle,
wherein, in the step of performing the travel control, in a case that the full user-requested driving force exceeds the system-required driving force in a state in which the user is not in contact with the operating element and a speed of the vehicle is not in excess of a speed threshold value, the travel control is performed on a basis of a partial user-requested driving force which is less than the full user-requested driving force;
in a case that the full user-requested driving force exceeds the system-required driving force in a state in which the user is not in contact with the operating element and a speed of the vehicle is in excess of a speed threshold value, the one or more processors cause the vehicle control device to perform the travel control on a basis of a partial driving force which is less than the partial user-requested driving force; and
in a case that the full user-requested driving force exceeds the system-required driving force in a state in which the user is in contact with the operating element, the travel control is performed on a basis of full the user-requested driving force without applying the limit to the user-requested driving force, and
wherein, in the step of performing the travel control, the vehicle is being automatically driven.

* * * * *